(12) United States Patent
Demory et al.

(10) Patent No.: US 12,174,515 B2
(45) Date of Patent: Dec. 24, 2024

(54) DOPED AMORPHOUS SILICON CARBIDE

(71) Applicant: Lawrence Livermore National Security, LLC, Livermore, CA (US)

(72) Inventors: Brandon Demory, Tracy, CA (US); Tiziana C. Bond, Livermore, CA (US); Clint Frye, Livermore, CA (US); Lars Voss, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 246 days.

(21) Appl. No.: 17/655,983

(22) Filed: Mar. 22, 2022

(65) Prior Publication Data

US 2023/0305359 A1 Sep. 28, 2023

(51) Int. Cl.
*G02F 2/02* (2006.01)
*C01B 32/956* (2017.01)
*C09K 11/69* (2006.01)

(52) U.S. Cl.
CPC .............. *G02F 2/02* (2013.01); *C01B 32/956* (2017.08); *C09K 11/698* (2013.01); *C01P 2002/54* (2013.01); *C01P 2004/03* (2013.01)

(58) Field of Classification Search
CPC ......... G02F 2/02; G02F 2/202; C01B 32/956; C09K 11/698
See application file for complete search history.

(56) References Cited

U.S. PATENT DOCUMENTS

| | | | |
|---|---|---|---|
| 2003/0127961 A1* | 7/2003 | De Fornel | H04L 9/0852 313/310 |
| 2015/0214389 A1 | 7/2015 | Nunnally | |
| 2017/0261835 A1 | 9/2017 | Koehl et al. | |
| 2021/0328685 A1 | 10/2021 | Wang et al. | |
| 2022/0013686 A1* | 1/2022 | Nagasawa | H01L 33/06 |

FOREIGN PATENT DOCUMENTS

| | | | | |
|---|---|---|---|---|
| DE | 3907857 C1 * | 5/1990 | | C23C 16/32 |
| DE | 102020126956 A1 * | 4/2022 | | G02F 1/0154 |

OTHER PUBLICATIONS

Lohrmann "A Review On Single Photon Sources In Silicon Carbide", Reports on Progress in Physics. vol. 80, No. 3 23pp, (2017) (Year: 2017).*
Xing et al, "CMOS-Compatible PECVD Silicon Carbide Platform for Linear and Nonlinear Optics", ACS Photonics, 2019, 6, 1162-1167 (Year: 2019).*
Spindlberger et al, "Optical Properties of Vanadium in 4H Silicon Carbide for Quantum Technology", Phys. Rev. Applied, 12.014015, 10 pages, 2019 (Year: 2019).*

(Continued)

*Primary Examiner* — David E Smith
(74) *Attorney, Agent, or Firm* — Knobbe, Martens, Olson & Bear, LLP

(57) ABSTRACT

Amorphous silicon carbide may be doped with one or more ions such as vanadium and these ions may radiate light if excited, for example, using optical or electrical pumping. A single photon light source may be formed from a single such ion that is pumped or from a plurality of ions that are pumped if light from only one ion is collected, e.g., using an aperture or pin hole. Such single photon sources may possibly be use in quantum computing, quantum sensing and/or quantum telecommunications.

18 Claims, 7 Drawing Sheets

(56) References Cited

OTHER PUBLICATIONS

Wolfowicz et al, "Vanadium Spin Qubits as Telecom Quantum Emitters in Silicon Carbide", arXiv:1908.09817, 16 pages, 2017 (Year: 2017).*
International Search Report and Written Opinion dated Jul. 11, 2023 in Application No. PCT/US2023/064719 in 9 pages.
Bosma et al., "Identification and tunable optical coherent control of transition-metal spins in silicon carbide," npj Quantum Information, vol. 4, No. 48, 7 pages (2018).
Diaz-Botia et al., "A silicon carbide array for electrocorticography and peripheral nerve recording," J. Neural Eng., vol. 14, 056006, 11 pages (2017).
Frye et al., "High temperature isotropic and anisotropic etching of silicon carbide using forming gas," J. Vac. Sci. Technol. A, vol. 39, No. 1, 013203, 6 pages (2021).
Karhu et al., "CVD growth and properties of on-axis vanadium doped semi-insulating 4H-SiC epilayers," Journal of Applied Physics, vol. 125, No. 4, 045702, pp. 1-23 (2019).
Lohrmann et al., "A review on single photon sources in silicon carbide," Reports on Progress in Physics, vol. 80, No. 3, pp. 1-23 (2017).
Murphy et al., "Design considerations for three-dimensional betavoltaics," AIP Advances 9, 065208, 10 pages (2019).
Rosenberger et al., "Quantum Calligraphy: Writing Single-Photon Emitters in a Two-Dimensional Materials Platform," ACS Nano, vol. 13, pp. 904-912 (2019).
Sinha et al., "Single-Photon Sources," Optics & Photonics News, Optics & Photonics News, vol. 30, pp. 32-39 (2019).
"Single Photon Sources" Reference Page, https://wwws.rri.res.in/quic/resources/opn2019/, Optics and Photonics News (2019).
Son et al., "Developing silicon carbide for quantum spintronics," Appl. Phys. Lett. 116, 190501, 7 pages (2020).
Spindlberger et al., "Optical Properties of Vanadium in 4H Silicon Carbide for Quantum Technology," Phys. Rev. Applied 12, 014015, 10 pages (2019).
Voss et al., "Maskless random antireflective nanotexturing of single crystal SiC," Journal of Vacuum Science & Technology B, vol. 37, No. 4, pp. 040601, 14 pages (2019).
Wolfowicz et al., "Vanadium spin qubits as telecom quantum emitters in silicon carbide," arXiv:1908.09817, 16 pages, (2019).
Wolfowicz et al., "Vanadium spin qubits as telecom quantum emitters in silicon carbide," Science Advances, vol. 6, No. 18, 16 pages, (2020).
Xing et al., "CMOS-Compatible PECVD Silicon Carbide Platform for Linear and Nonlinear Optics," ACS Photonics, vol. 6, pp. 1162-1167 (2019).
Ziai, S., "Silicon photonic quantum computing," Cadence Photonics Summit, PsiQuantum Corporation, 72 pages, Nov. 7, 2018.

* cited by examiner

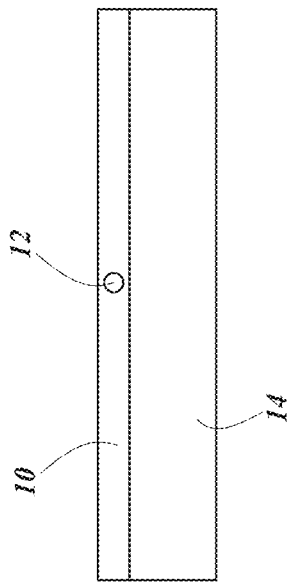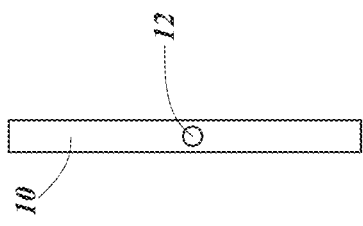

DOPED AMORPHOUS SILICON CARBIDE

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to doped amorphous silicon carbide, and more specifically to amorphous silicon carbide doped with vanadium, which may be pumped to produce a light source such as single photon light source for possible use in quantum computing, sensing and telecommunications.

Description of the Related Art

Reliable qubit generation is one of the biggest focus areas in quantum computing, sensing and communications. An ideal single photon source (SPS) is a prime candidate for qubit generation as it can generate on-demand, indistinguishable photons with high brightness and fidelity. Many approaches have been explored for SPSs, including non-linear laser processes, quantum dots, and Nitrogen Vacancy (NV) centers in diamond; however, each approach has drawbacks that prevent it from being ideal. Non-linear laser processes are generally not deterministic, quantum dots are generally reliant on cryogenic temperatures, and diamond appears to have scalability issues. What is needed is a single photon source without such limitations.

SUMMARY

The present disclosure generally relates to amorphous silicon carbide (a-SiC) doped with ions. Amorphous silicon carbide, for example, can be doped with vanadium, which can radiate near the telecom wavelength of 1300 nm. Doped amorphous silicon carbide can be employed as a single photon light source possibly for use in computing, communications, sensing and other applications. Various devices, systems, and methods described herein utilize doped amorphous silicon carbide such as vanadium doped amorphous silicon carbide.

For example, in one design, a light source comprises a light emitter comprising amorphous silicon carbide having an ion therein and a pump configured to direct energy to the amorphous silicon carbide to excite the ion into a higher energy state such that the ion emits light. In some examples, the ion comprises a vanadium ion. In various examples, the pump may comprise an optical pump, such as a laser, configured to output light that is directed to the amorphous silicon carbide to excite the ion therein. The pump may also comprise an electrical contact configured to deliver electrical power to excite the ion into a higher energy state such that the ion emits light.

Also disclosed herein is a device comprising a host comprising amorphous silicon carbide and a vanadium ion in the host of amorphous silicon carbide. In various implementations, the amorphous silicon carbide may be doped to ion concentrations of from $2.5 \times 10^{21}$ ions/cm$^3$ to $1 \times 10^{11}$ ions/cm$^3$, for example, from $1 \times 10^{15}$ ions/cm$^3$ to $1 \times 10^{11}$ ions/cm$^3$ over at least a portion of the a-SiC (e.g. that receives the pump energy such as the pump light). In various implementations, the dose concentration for implanting the amorphous silicon carbide with ions may less than $1 \times 10^{15}$ ions/cm$^2$, less than $1 \times 10^8$ ions/cm$^2$, for example, from $1 \times 10^{15}$ ions/cm$^2$ to $1 \times 10^{10}$ ions/cm$^2$ or from $1 \times 10^{15}$ ions/cm$^2$ to $1 \times 10^6$ ions/cm$^2$ over at least a portion of the a-SiC (e.g. that receives the pump energy such as the pump light). In some designs, the amorphous silicon carbide comprises a layer of amorphous silicon carbide on a silicon substrate.

As discussed above, devices disclosed may be used in photonic integrated circuits and/or quantum computing, quantum sensing and/or quantum communication systems. The devices may, for example, be used for deterministic single photon source near a telecom band, qubit generation, quantum key distribution, room temperature single photon emission, near infrared single photon source, or other applications.

One possible advantage is that amorphous silicon carbide can be readily integrated with other silicon-based technology. Amorphous silicon carbide can be relatively easy to manipulate in fabrication as a-SiC has fewer constraints on substrate compatibility and can be deposited freely on a wide array of substrates. Likewise, amorphous silicon carbide can be integrated with silicon photonics structures. Integration with silicon technology can potentially improve the usability of these emitters by increasing the temperature range of operation, minimizing photon out-coupling issue, and leveraging silicon maturity. In some implementations, for example, room temperature qubit sources comprising doped amorphous silicon carbide can be integrated with silicon.

BRIEF DESCRIPTION OF THE DRAWINGS

The drawings described herein are for illustrative purposes only of selected embodiments and not all possible implementations and are not intended to limit the scope of the present disclosure. Corresponding reference numerals indicate corresponding parts throughout the several views of the drawings.

FIG. 1 is a schematic view of an example amorphous silicon carbide host having an ion embedded therein.

FIG. 2 is a schematic view of an example amorphous silicon carbide layer on a silicon substrate wherein the amorphous silicon carbide layer has an ion embedded therein.

DETAILED DESCRIPTION

Figure 3:
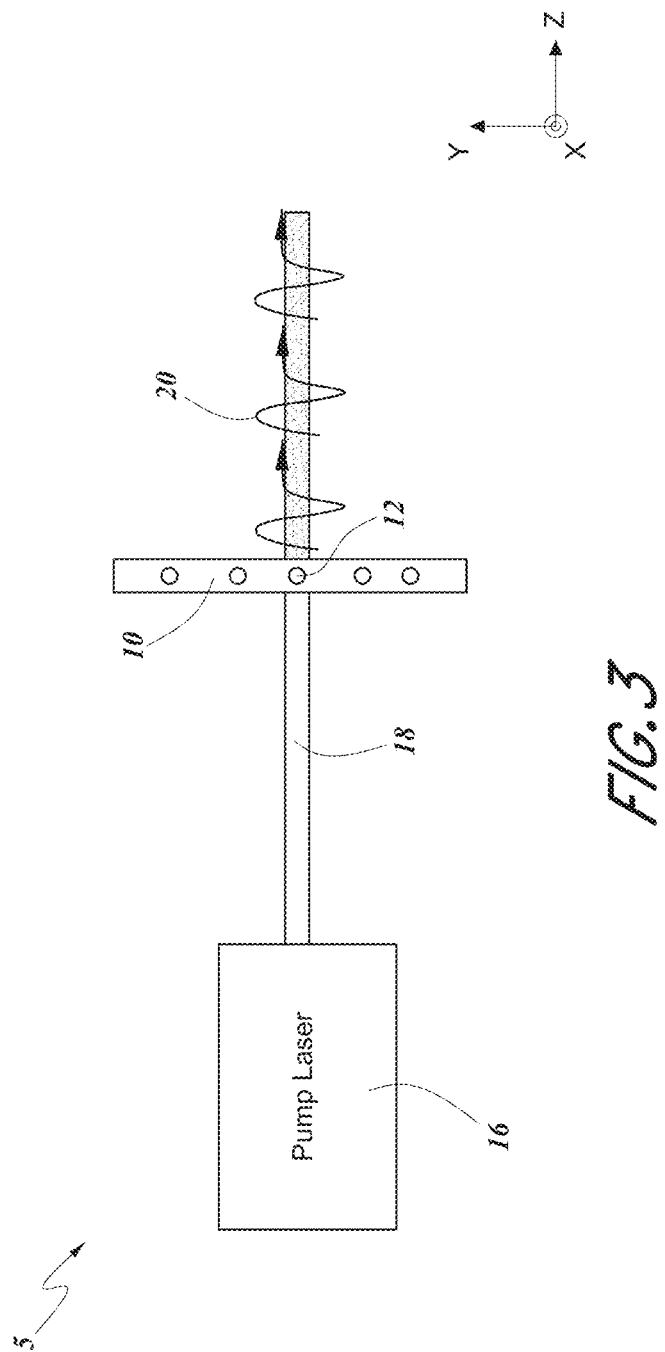
FIG. 3 is a schematic view of an example light source comprising an optical pump such as a laser emitting a beam that is incident on an amorphous silicon carbide host having an ion embedded therein that can be excited by the beam to thereby emit light.

Amorphous silicon carbide (a-SiC) may be a host for ions that can be excited to higher energy states. Light can subsequently be emitted from the ions when the ions transition to a lower energy state. These transitions may in some cases comprise atomic electron transitions. The host amorphous silicon carbide can support one or more ions such that energy can be delivered to the one or more ions to cause an electron to move from one electron energy level to another higher electron energy level in the ion. The ion or ions will subsequently emit light when the electron moves to a lower electron level. A single photon source can be produced by configuring the ion doped silicon carbide with a single ion that emits light and/or by collected light from a single ion using for example a stop, an aperture, or pin hole.

FIG. 1 shows an amorphous silicon carbide host 10 including an ion 12 therein. The host 10 comprises amorphous silicon carbide, for example, in which the ion 12 is embedded or implanted. The host 10 provides a structure to support the ion 12. The host may comprise, for example, a piece of amorphous silicon carbide that may take the form of a slab, sheet, or other portion of silicon carbide, in various examples, thereby comprising a body or support structure in which the ion 12 can be included. The size, e.g., length, width, and/or thickness, of the amorphous silicon carbide host 10 can vary. The ion 12 may comprise a defect in the amorphous silicon carbide, which can produce emission, e.g., single photon emission.

The ion 12 can be at a surface of the amorphous silicon carbide host 10 or deeper therein. In some implementations, ions 12 implanted within amorphous silicon carbide 10 have a penetration depth of 5 or 10 nanometers (nm) or more, possibly 10 to 20 nm or 20 to 40 nm, possibly 20 to 100 nm or any range between any of these values, although depths outside these ranges are also possible. Adjusting the implantation energy can be used to control the depth of the implanted ions 12 in the amorphous silicon carbide. Accordingly, the ions 12 need not be at the surface but can be deeper within the amorphous silicon carbide host 10. The location of the ion 12 in the host structure 10 can vary. In some implementations a plurality of ions 12 are included in the a-SiC host 10, while in some implementations only a single ion is included in the a-SiC host. However, multiple ions will likely be implanted. The density of ions 12 can be low enough at the sample surface such that the spacing between ions (e.g., vanadium ions) is sufficiently large to enable a single ion to be isolated for light emission and/or light collection.

The ion 12 can be implanted in the amorphous silicon carbide host 10 using ion implantation techniques or otherwise. Other techniques for placing the ion or ions 12 into the amorphous silicon carbide host 10 can be employed. In some implementations, an additional layer, for example, of metal (e.g., gold), can be deposited over the amorphous silicon carbide prior to implantation and used to control the amount of ions 12 that reach the host amorphous silicon carbide 10. This additional layer, which may be referred to as a cap layer, may, for example, be deposited directly on the amorphous silicon carbide host 10 or on a layer thereon and may possibly be removed after the ion(s) are deposited on or in the a-SiC host. Ions may be implanted in the additional layer instead of the amorphous silicon carbide and these ions 12 may be removed with the removal of the additional layer.

In some implementations, the amorphous silicon carbide host 10 may comprise a layer for example on a substrate 14 as illustrated in FIG. 2. In some implementations, the substrate comprises a silicon substrate 14 such as a silicon wafer. Advantageously, amorphous silicon carbide is compatible with crystalline silicon and can be deposited thereon. Amorphous silicon carbide does not pose lattice mismatch problems. Although the amorphous silicon carbide host 10 is shown directly on the substrate 14 with no intervening layer therebetween, in other implementations, one or more intervening layers may be between the amorphous silicon carbide and the substrate. One or more layers of silicon and/or silicon dioxide, for example, may be between the amorphous silicon carbide host 10 and the substrate 14, for example, if the substrate comprise silicon. Compatibility with crystalline silicon can enable the amorphous silicon carbide host 10 to be integrated with integrated circuits including photonic integrated circuits such as those comprising silicon and/or formed on a silicon substrate or wafer. Amorphous silicon carbide can, for example, be used on silicon-on-insulator (SOI) wafers.

As discussed above, the ion or ions 12 can be implanted in the amorphous silicon carbide host layer 10 using ion implantation techniques or otherwise. As is well known, magnetic fields and/or electric fields may be employed to produce and direct ions 12, which have charge, into samples to implant ions therein. For example, in various implantation methods, an ion beam is directed to and possibly raster scanned across the amorphous silicon carbide, with a current to generate the desired ion dose. A voltage is applied to the ions and this voltage controls the ion acceleration and the depth of penetration of these ions into the amorphous silicon carbide. The dose concentration is directly correlated to the sample concentration or the concentration of ions implanted in the amorphous silicon carbide. Other techniques for placing the ion or ions 12 into the amorphous silicon carbide host layer 10 can be employed. In some implementations, a cap layer for example comprising metal (e.g., gold) can be used to control the amount of ions 12 deposited on or in the host amorphous silicon carbide 10. This cap layer may, for example, be deposited on the amorphous silicon carbide host layer 10 or a layer thereon and may possibly be removed after the ion(s) 12 are deposited on or in the a-SiC host.

As discussed above, the ion(s) 12 may comprise vanadium such as a $V^{4+}$ ion. Vanadium ions may have an electron transition that provides for the emission of light at a wavelength or wavelengths compatible with telecommunications equipment, which operate at a wavelength or wavelengths at or close to, for example, 1300 nm. Accordingly, vanadium ions 12 may be included in the amorphous silicon carbide host 10, producing a-SiC:V, in some implementations described herein. The vanadium may form a vanadium defect in the amorphous silicon carbide, which can produce emission, e.g., single photon emission. In other designs, other types of atoms, for example, that emit light possibly at other wavelengths, may be used.

To produce such optical emission from the ion 12, the amorphous silicon carbide host 10 having the ion or ions therein may be pumped with energy. Optical and/or possibly electrical pumping may be used. FIG. 3, for example, shows a light source 5 comprising a pump 16 and more particularly an optical pump comprising a laser configured to pump an a-SiC host 10 that includes a plurality of ions 12 therein. The optical pump 16 outputs light, e.g., a beam, 18 that is directed to and is thereby incident on the amorphous silicon carbide host 10 having the ion or ions 12 therein. In various implementations, the pump 16 comprises a pump laser that outputs a laser beam 18 that is directed to and is thereby incident on the amorphous silicon carbide host 10 having the ion or ions 12 therein. In some implementations, the light 18 from the pump 16 is directed onto an area of the amorphous silicon carbide host 10 such that ions 12, possibly a single ion, that is within that area of the amorphous silicon carbide receives the pump radiation and is thereby excited or energized (e.g., one or more electrons are excited to higher energy levels) so as to be able to emit light 20 therefrom. Ions 12 spatially located outside that area of the amorphous silicon carbide silicon host 10 may not receive the pump radiation 18 and thus may not be excited or energized (e.g., may not have one or more electrons that are excited to higher energy levels) and thus do not emit light 20 therefrom. As shown in FIG. 3, a number of ions 12 are included in the amorphous silicon carbide host 10, however, only a single ion is in the path of the pump beam 18 and thus only a single ion is excited or energized by the pump radiation and only a single ion emits light 20. Such a configuration may be used to produce a single photon source capable of producing single photon emission (SPE). In some implementations, optical pulses, possibly having only a single photon, are emitted from the single ion and thus from the light source 5. Single photon emission, SPE, can thereby be obtained.

FIG. 3 is a schematic illustration of a light source 5 comprising a pump 16 directing a beam 18 onto an amorphous silicon carbide host 10 having an ion 12 such as a vanadium ion therein. The light source 5 is shown as producing output emission 20 possibly comprising single photon emission pulses. Optics may be included in the path of the light to form beams or maintain the beam shape and/or to control the direction of the beams. For example, light emitted from the ion 12 in the silicon carbide host 10 is generally not a beam of light. Rather light is emitted in any direction. Optics may be used to capture the portion of this emission that is emitted from the ion 12 in the silicon carbide host 10, e.g., toward the Z direction and form a beam, e.g., in the Z direction, as shown in FIG. 3. Additionally, the pump beam 18 and output emission 20 are shown propagating along a longitudinal direction, e.g., parallel to a z-axis shown on an xyz coordinate system. The light from the pump 18 and/or the output light 20 need not be so limited. One or more optical elements including possibly mirrors may be included in the system 5 such that the pump light 18 and/or output light 20 may take another form. The beams may follow different beam paths. Additionally, in FIG. 3, ions 12 are shown dispersed in a lateral direction throughout the a-SiC host 10 (e.g., parallel to the y direction or axis). The ions 12 may also be dispersed in the orthogonal direction (e.g., orthogonal to the y and z directions and/or axes such as in a direction parallel to the x-axis). The distribution of ions 12 may be different, however, than shown. More or less ions 12 may be included in the host 10 and may be distributed differently. Accordingly, other configurations than shown in FIG. 3 are possible.

For example, although optical pumping is shown in FIG. 3, electrical pumping may be employed to energize the ion or ions 10 (e.g., to excite an electron from one energy level to another in the ion). The amorphous silicon carbide host 10 having the ion 12 therein may be electrically connected to one or more contacts to apply electrical power, e.g., voltage and/or current to the amorphous silicon carbide host having the ion or ions therein. Such electrical power may excite and/or energize the ion or ions 12 within the host 10 such that the ion or ions emit light. As discussed above, energy applied to the host 10 and/or ion(s) 12 may excite the transition of an electron within the ion to a higher energy state or level. The electron may transition to a lower energy state or level and emit light in the process.

Since the emitted light is produced by a transition from one state to another state and/or from one energy level to another energy level, the light may have distinct spectral characteristics. For example, the wavelength or spectral distribution of the light may comprise a narrow spectral peak in some implementations.

Figure 4:
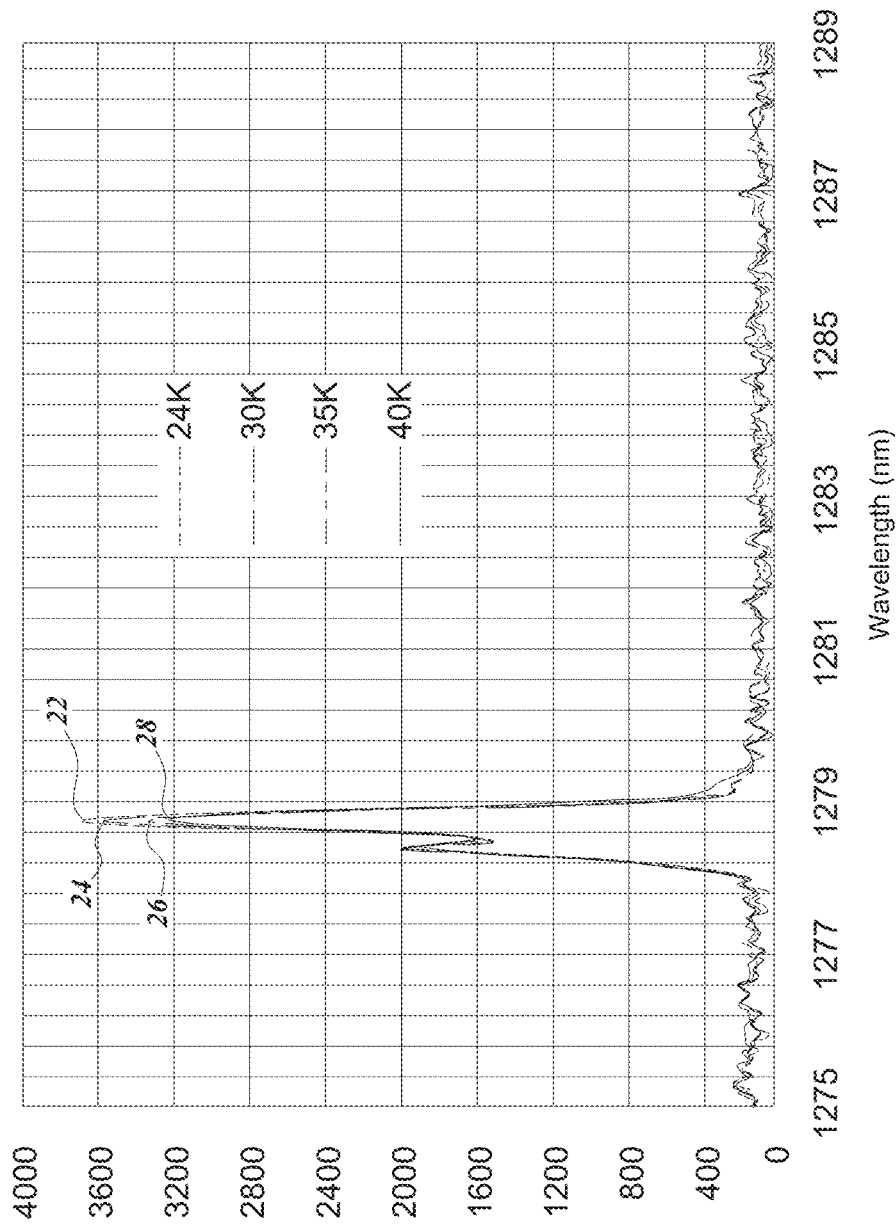
FIG. 4 is a plot on axes of wavelength (in nanometers) and intensity (in arbitrary unis) of photoluminescence spectra having intensity peaks at around 1278-1279 nm for amorphous silicon carbide doped with vanadium ions (at a dose concentration level of about $1 \times 10^{15}$ ions/cm$^2$) at different temperatures of 24 K, 30 K, 35K and 40K.

FIG. 4 shows a spectral distribution of photoluminescence obtain from a sample comprising vanadium doped amorphous silicon carbide (a-SiC:V) that is illuminated with a pump beam 18. In this example, the pump beam 18 had a wavelength of 532 nm. The amorphous silicon carbide comprised a layer of amorphous silicon carbide 10 (about 100 nm thick) formed on a silicon wafer. The amorphous silicon carbide was doped with vanadium ions using a dose concentration of $1\times10^{15}$ ions/cm$^2$. FIG. 4 shows photoluminescence spectra from vanadium ions in amorphous silicon carbide taken at various cryogenic temperatures: 24K, 30K, 35K and 40K. The spectra at the different temperatures have spectral peaks centered around 1278-1279 with a full width have maximum of less than 2 nm, possibly about 1 nm or 0.5 nm or less or any range between any of these values or outside these ranges. The photoluminescence spectra at the four temperatures, 24K, 30K, 35K and 40K, exhibits respective peaks having a maximum intensity 22, 24, 26, 28 that decreases with increasing temperatures. Photon emission is a radiative process. Optical intensity decreases with temperature because excited energy is lost to non-radiative processes. Examples of such non-radiative decay channels include phonons or heat. The peaks also appear to red shift slightly with increasing temperature.

At cryogenic temperatures, the photoluminescence peaks highly resemble the emission from vanadium incorporated in 4H crystalline SiC. In particular, the identified peaks resemble the alpha peaks, which are the main atomic transition of the vanadium ion. Because this electron transition is an atomic transition, exciting the transition corresponds to a single photon of energy corresponding to the change in energy associated with the transition.

In various implementations, to provide single photon emission, the amorphous silicon carbide 10 comprises a single ion 12 that is excited so as to emit light 20. Accordingly, the number of ions 12 in the amorphous silicon carbide may be reduced.

Figure 5:
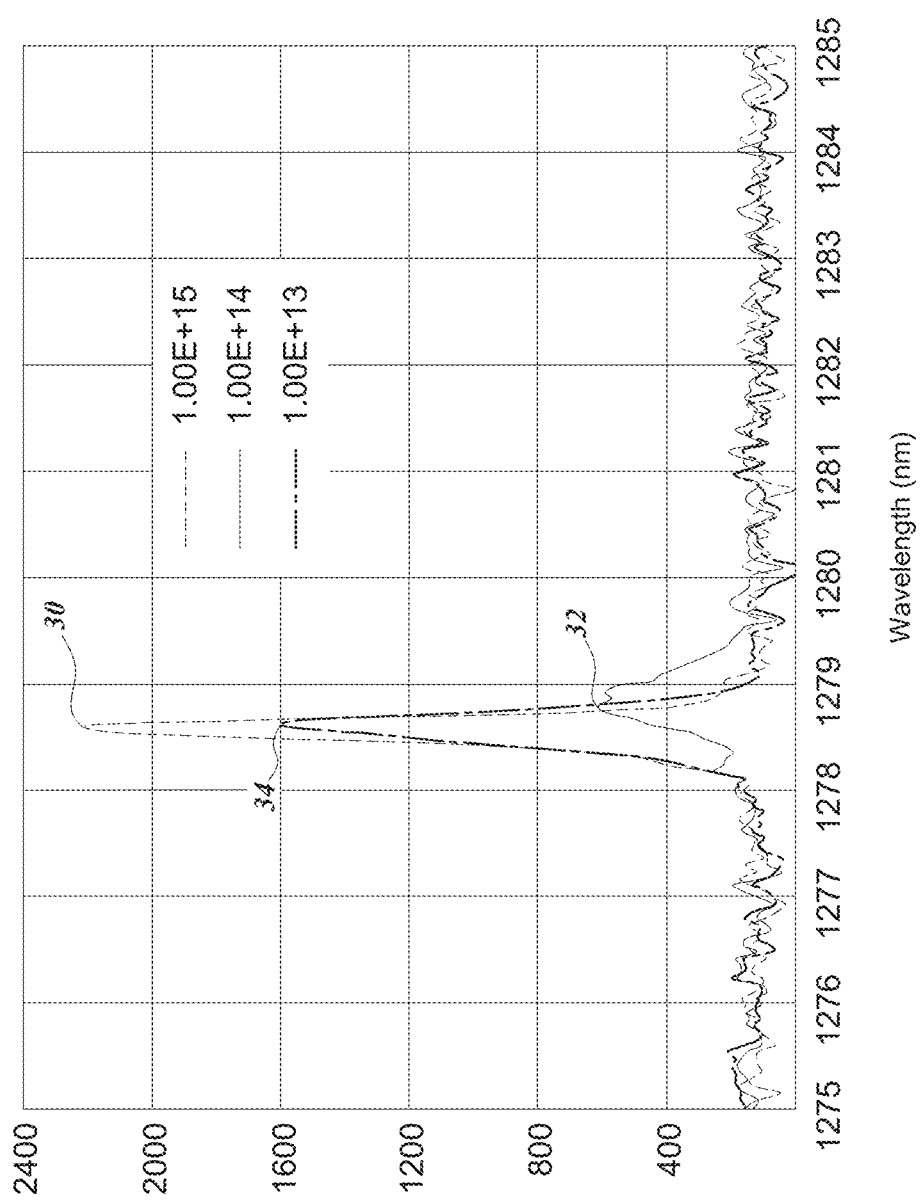
FIG. 5 is a plot on axes of wavelength (in nm) and intensity (in arbitrary unis) of photoluminescence spectra having intensity peaks at around 1278-1279 nm for amorphous silicon carbide doped with vanadium ions with ion dose concentration levels of about $1 \times 10^{13}$ ions/cm$^2$, $1 \times 10^{14}$ ions/cm$^2$ and $1 \times 10^{15}$ ions/cm$^2$.
Figure 6:
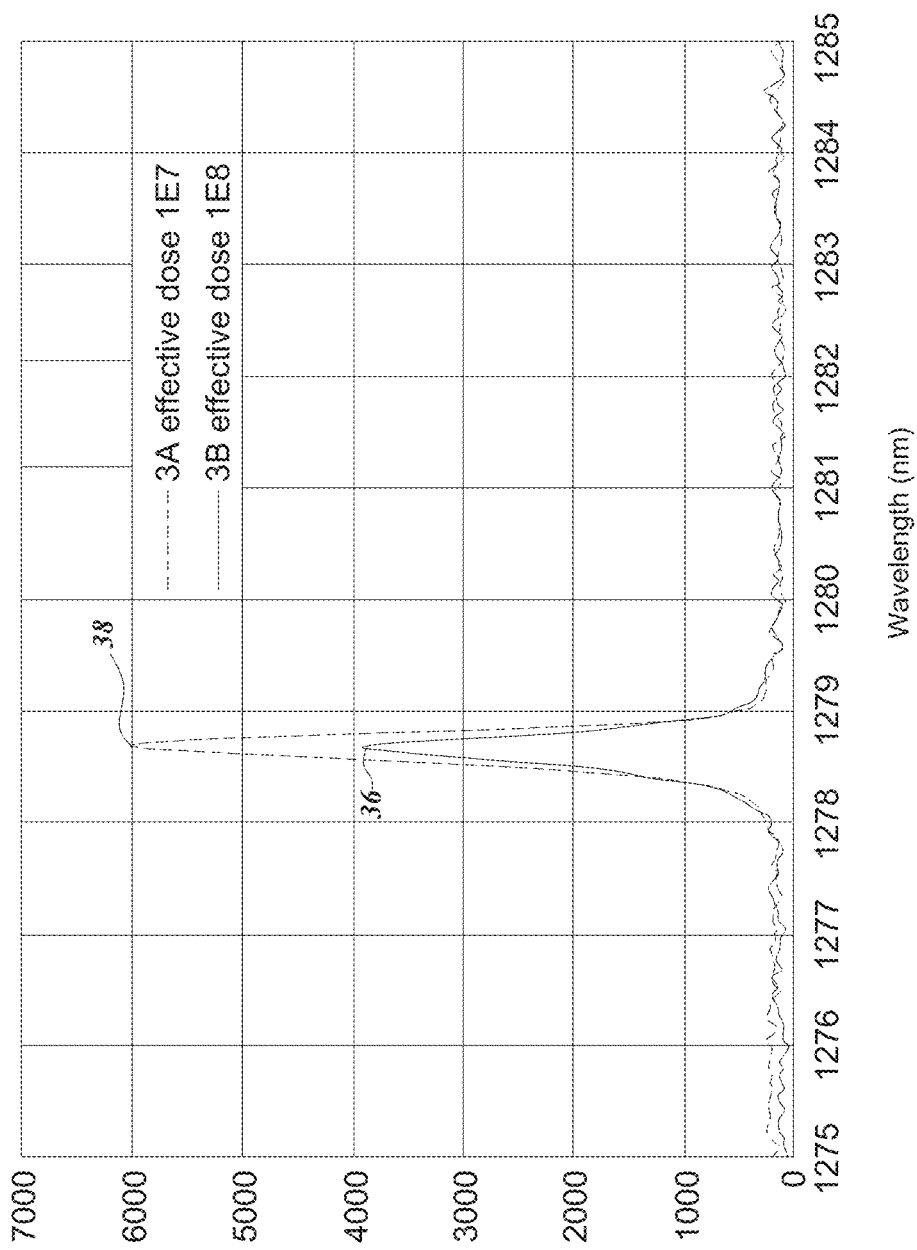
FIG. 6 is a plot on axes of wavelength (in nm) and intensity (in arbitrary unis) of photoluminescence spectra having intensity peaks at around 1278-1279 nm for amorphous silicon carbide doped with vanadium ions with ion dose concentration levels of about $1\times10^7$ ions/cm$^2$ and $1\times10^8$ ions/cm$^2$.

FIGS. 5 and 6 also show photoluminescence spectra for samples comprising vanadium doped amorphous silicon carbide (a-SiC:V) that is illuminated with a pump beam 18. In these examples, the pump beam 18 also had a wavelength of 532 nm, and the amorphous silicon carbide comprised a layer of amorphous silicon carbide 10 (about 100 nm thick) formed on a silicon wafer. The measurements were obtained at 24 Kelvin (K). FIG. 5 shows photoluminescence spectra from vanadium ions in amorphous silicon carbide taken at various dose concentrations: $1\times10^{13}$ ions/cm$^2$, $1\times10^{14}$ ions/cm$^2$, and $1\times10^{15}$ ions/cm$^2$. The photoluminescence spectra for the three concentrations exhibits peaks haves a maximum intensity 30, 32, 34 centered around 1278-1279 nm with a full width half maximum of less than 2 nm, possibly about 1 nm or 0.5 nm or less or any range between any of these values or outside these ranges. Notably, the vanadium doped amorphous silicon carbide emission peak appears to match that an emission peak in the photoluminescence spectra for vanadium doped crystalline silicon carbide. The intensity peak for the sample with a dose concentration of $1\times10^{15}$ ions/cm$^2$ was higher than the intensity peaks for the samples with dose concentrations of $1\times10^{13}$ ions/cm$^2$ and $1\times10^{14}$ ions/cm$^2$. However, the intensity peak for the sample with a dose concentration of $1\times10^{13}$ ions/cm$^2$ was higher than the intensity peak for the sample with a dose concentration of $1\times10^{14}$ ions/cm$^2$. Ion implantation was employed to dope these amorphous silicon carbide samples with vanadium. Namely, these samples were exposed to an ion beam of vanadium ions that was incident on the sample causing vanadium ions to be imbedded in the amorphous silicon carbide.

Photoluminescence spectra from vanadium ions in amorphous silicon carbide having lower concentrations obtained by depositing at least one additional layer having a thickness over the amorphous silicon carbide are shown in FIG. 6. In this example, this additional layer, which may be referred to as a cap layer, comprised a metal (e.g., gold) layer. This cap layer can be removed, for example, by etching, after ion implantations. Different ions 12 are implanted at different depths in a sample. Accordingly, some ions 12 will be implanted into the amorphous silicon carbide and some ions will be implanted in the cap layer. Therefore, by including the cap layer, which is subsequently removed, less ions are imbedded in the amorphous silicon carbide. The concentration of ions 12 in the amorphous silicon carbide can thereby be reduced. Moreover, implantation will follow a distribution. In the example, the peak of the distribution is centered in the cap (e.g., gold) layer and the tail of the distribution is in the a-SiC layer. Therefore, less ions reach the SiC and the effective dose is lower. Accordingly, FIG. 6 shows photoluminescence spectra from vanadium ions 12 in amorphous silicon carbide having lower dose concentrations, namely, $1\times10^7$ ions/cm$^2$ and $1\times10^8$ ions/cm$^2$. The photoluminescence spectra for the $1\times10^7$ ions/cm$^2$ and $1\times10^8$ ions/cm$^2$ concentrations exhibits spectral peaks having a maximum intensity 36, 38 centered around 1278-1279 nm with a full width half maximum (FWHM) of less than 2 nm, possibly about 1 nm or 0.5 nm or less or any range between any of these values or outside these ranges. Notably, the vanadium doped amorphous silicon carbide emission peak appears to match an emission peak in the photoluminescence spectra for vanadium doped crystalline silicon carbide (e.g., a spectral peak for 4H-SiC:V).

For a sample having a dose concentration of $1.90\times10^8$ ions/cm$^2$, the effective dose may translate into about 200 vanadium ions per 10 μm by 10 μm square area in some implementations. The implantation can be virtually at the surface with a penetration depth of approximate 20 nm. The excitation beam 18 was about 9 μm across (e.g., the diameter of the cross-section of the beam orthogonal to the beam's propagation direction). Accordingly, a number of ions likely were excited by the pump beam 18 in these examples.

For single photon operation, a single ion is excited or the number of ions that are excited and emit light and from which emission is collected is reduced. Exciting and obtaining emission from a single ion may involve spreading out the ion spatially such that only one ion received the pump energy (e.g., pump beam 18) and emits light and/or by blocking emission from nearby emitters using, for example, a stop, an aperture or pin hole to reduce the number of ions from which light is collected to one ion, e.g., by blocking light emitted from other ions.

Figure 7:
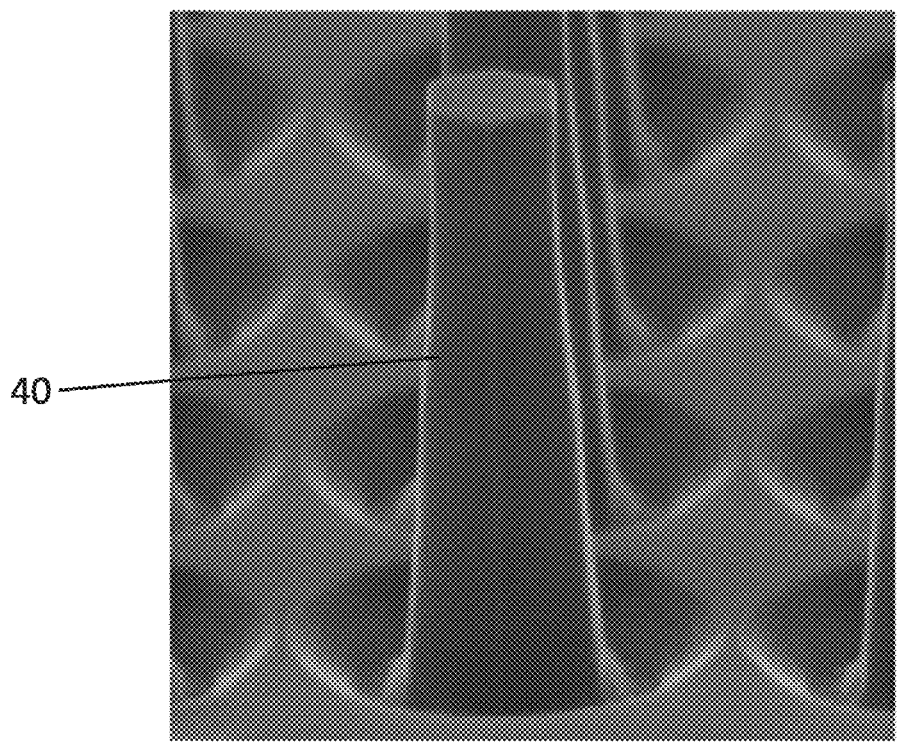
FIG. 7 is a scanning electron microscope image of an example of a microstructure comprising a micropillar. Ion doped amorphous silicon carbide may possibly be included in microstructures or nanostructures such as pillars, which may enhance signal output.

For these examples, measurements were obtained with the sample cooled to cryogenic temperatures (e.g., 24K) using a liquid helium cryostat. In some implementations, the doped a-SiC may be used at cryogenic temperatures, for example, at 77K or less, e.g., from 77K to 24K or from 77K to 4K or in any range formed by any of these values. However, room temperature operation may be feasible, possible with signal enhancement such as by using microstructures, nanostructures, and/or resonators as discussed below in connection with FIGS. 7, 8A and 8B. Nanostructures having lateral dimensions, e.g., a width, in one or two directions, possibly orthogonal directions, less than 1 micron (um) and in the nanometer range may include vanadium doped amorphous silicon carbide. Such structures may additionally or alternatively have a height less than 1 micron and in the nanometer range. Microstructures having one or more dimensions in the micrometer range may also be used in certain implementations. FIG. 7 shows an example pillar 40 comprising SiC. The pillar shown in FIG. 7 has a lateral dimension (e.g., width or diameter) of about 2 microns and a height of about 5 microns. The pillar comprises crystalline silicon carbide. In this example, the pillar is formed by etching the silicon carbide. This SiC pillar 40 was polished with $H_2$. For additional discussion of such crystalline silicon carbide pillars see, e.g., J. Vac. Sci. Technol. A 39, 013203 (2021). The pillar may be smaller in some implementations. For example, in various implementations, nanostructures such as nanopillars may be employed. Doped amorphous silicon carbide may be included in or on such a pillar 40, which can be excited (e.g., with a pump source such as a pump laser or electrically) to energize an ion emitter which may comprise, for example, a vanadium ion. The nanostructure or microstructure may potentially enhance the signal output possibly enabling single photon emission. The nanostructure or microstructure can increase light extraction. In a planar film version, a percentage of photons are trapped in the film layer and collection of these photons is inhibited. Changing the geometry can assist with the light extraction. In addition, emitters may emit be more strongly coupled to radiation modes when surrounded by a lower index material (e.g., vacuum or air) as a result of a change in the local density of states. Coupling to radiation modes reduces coupling to the non-radiative modes (such as phonons).

Figure 8B:
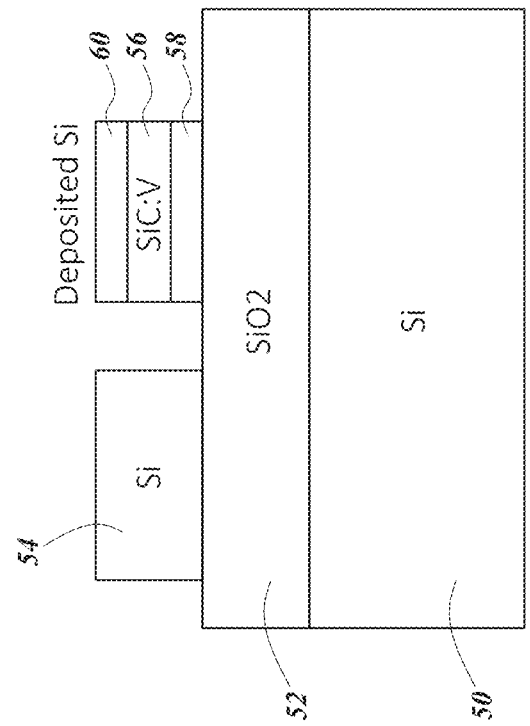
FIGS. 8A and 8B are top and cross-sectional views of a ring resonator having a layer of vanadium doped amorphous silicon carbide therein.
Figure 8A:
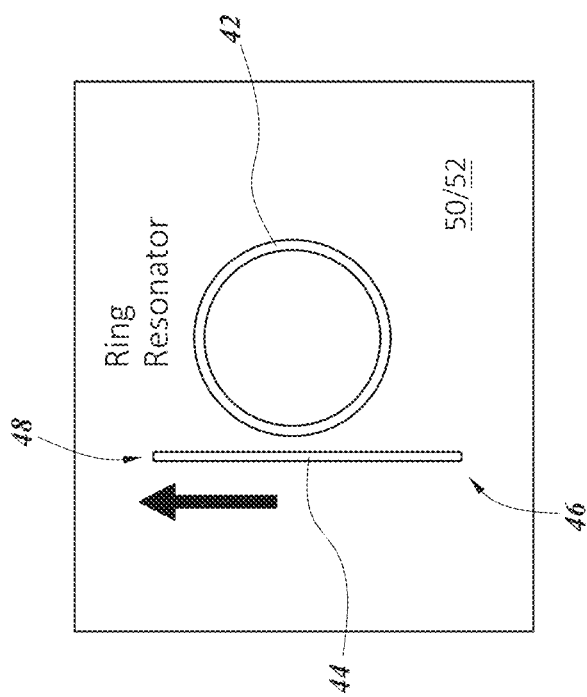

Likewise, amorphous silicon carbide may be included in a resonator or optical cavity to enhance the signal. In some implementations, the micropillar or nanopillar may act as a resonator, for example, in the Z (e.g., vertical) direction assuming the rod or pillar is oriented with the longest dimension in the Z direction. In such cases, the top and bottom surface of the nanopillar or micropillar may form a resonator. The structure may be radially symmetrical. Other configurations and types of resonators or optical cavities may be possible. The resonator may also comprise, for example, a ring resonator 42 such as shown in FIGS. 8A and 8B. Such a ring resonator 42 may comprise a waveguide. This waveguide may be in the form of a ring as shown in FIG. 8A. Resonance may be achieved for suitable wavelengths depending on the circumference of the ring. The ring resonator 42 may comprise ion-doped silicon carbide to provide emission upon pumping. As discussed herein, the ion doping may comprise doping with vanadium in certain implementations. An input/output waveguide 44 is disposed adjacent to the ring resonator waveguide 42. The input/output waveguide 44 may be sufficiently close to the ring resonator waveguide 42 to be evanescently coupled thereto.

The input/output waveguide 44 may additionally be optically coupled to the pump source 16 at a first end 46 such that pump radiation may be coupled into the ring resonator 42. The input/output waveguide 44 may also have a second end 48 where emission from vanadium within the ring resonator 42 exits.

These waveguides may comprise a ridge waveguide, rib waveguide, a strip-loaded waveguide, a buried channel waveguide or other types of waveguides. FIG. 8B shows as cross-section of the ring resonator and the input/output waveguide adjacent thereto. In this example, the ring resonator 42 and input/output waveguide 44 comprise ridge waveguides.

As illustrated in FIG. 8B, the waveguides 42, 44 are disposed on a substrate 50 such as s silicon substrate. One or more intervening layer 52 may be between the waveguides 42, 44 and the substrate 50. In the example shown, a silicon dioxide layer 52 is disposed between the waveguides 42, 44 and the substrate 50. In this example, the input/output waveguide 44 comprises a core region 54 comprising higher index material such as silicon. The silicon dioxide layer 52 beneath the silicon core 54 comprises a cladding layer in this design. The ring resonator 42 also comprise a core region comprising higher index material, e.g., material having a higher index than the cladding 52. In this design, the ring resonator 42 comprises a layer of ion doped amorphous silicon carbide 56 sandwiched between top and bottom core layers, 58, 60 comprising silicon in this implementation. As discussed herein, in various designs, the amorphous silicon carbide may be doped with vanadium. Pump light propagating within the core region of the ring resonator 42 can thus be incident on one or more ions 12 within the amorphous silicon carbide layer 56. Similarly, emission from the doped amorphous silicon carbide layer 56 may be guided within the ring resonator 42. The output signal may be enhanced by the resonator. Emission from the ion has a lifetime, which is a measure of the time for the emission to occur. The resonator reduces the lifetime, which without relying on any scientific theory results from the Purcell effect of the resonator, and allows more photons to be extracted. In the case of a single photon source, the consequence is that pumping for another photon occurs at a faster rate since the lifetime is shorter. So, the source is 'brighter' because more single photons (e.g., single photons per second) are obtained. The rate of single photon emission may be increased. At least a portion of this light is coupled out of the ring-shaped waveguide 42 to the input/output waveguide 44 and proceeds to the end 48 of the input/output waveguide for egress.

Accordingly, in this design, the ring resonator 42 comprise a stack comprising a silicon layer 58, a doped amorphous silicon carbide layer 56, and another silicon layer 60 (e.g., Si/a-SiC:V/Si). As shown, in some implementations, the resonator may comprise a slot waveguide such as, for example, a horizontal slot waveguide. The index of refraction contrast is high, thereby enabling confinement of optical energy in the waveguide 42 comprising the a-SiC layer 56. In various implementations, for example, silicon carbide and silicon have reasonably close indices of refraction. For example, the refractive index of Si may be about 3.5, and the refractive index of SiC may be about 3.2. High contrast may result when integrated with $SiO_2$, which has an index of refraction of about 1.46. In various implementation, one or more waveguides comprising silicon and a-SiC are formed on a SOI wafer comprising silicon dioxide. Amorphous silicon carbide also has less thermal drift of the index of refraction than pure silicon. The refractive index of the amorphous silicon carbide may therefore change less than pure silicon with changes in temperature such as with heating.

Other types of waveguide structures are possible. For example, the resonator may comprise a disc resonator (e.g., a microdisc) in some implementations. As discussed above, the resonator may comprise doped amorphous silicon carbide that emits light in response to receiving pumping energy as described herein. In some implementations, the disc resonator (e.g., microdisc resonator) may include a sandwiched amorphous silicon layer, for example, a-SiC sandwiched between two layers such as two silicon layers, e.g., similar to the Si/a-SiC:V/Si sandwich waveguide structure shown in FIG. 8B. Other types of resonator or optical cavities, including resonant dielectric cavity structures, having doped amorphous silicon (e.g., vanadium doped a-SiC) configured to emit light are possible. As discussed herein, use of a-SiC with implanted Vanadium for site-controlled single photon emitters enhanced by resonant dielectric cavity structures that operate at room temperature may be possible. Other types of waveguides structures, microstructures and/or nanostructures may be employed as well. Different types of waveguides as well as different waveguide devices may include amorphous silicon carbide that is doped with one or more ions, such as vanadium, that emit light when pumped. Other types of microstructures and/or nanostructures can be employed possibly to enhance output and may include amorphous silicon carbide that is doped with one or more ions, such as vanadium, that emit light when pumped. One benefit of amorphous silicon carbide is that amorphous silicon carbide can be integrated in a silicon-based platform and may be integrated with silicon devices such as silicon photonic integrated devices and silicon integrated circuits. Advantageously doped amorphous silicon carbide is CMOS compatible (e.g., compatible with Si CMOS processing) and can be use with SOI wafers.

Amorphous silicon carbide may be deposited on the surface of silicon using, for example, a Plasma Enhanced Chemical Vapor Deposition process (PECVD). See, for example, C. A. Diaz-Botia et al, "A silicon carbide array for electrocorticography and peripheral nerve recording", J. Neural Eng., 14 056006, 2017. In various of the examples described above, 100 nm amorphous SiC was deposited.

Ion implantation can be employed to provide the amorphous silicon carbide with vanadium ions. Vanadium doses of $1\times10^{13}$ ions/$cm^2$, $1\times10^{14}$ ions/$cm^2$, and $1\times10^{15}$ ions/$cm^2$ were implanted with 50 keV of energy used to accelerate the ions to implant the ions in the a-SiC. In various implantation methods, an ion beam is directed to and possibly raster scanned across the amorphous silicon carbide with a current to generate the desired ion dose. A voltage is applied to the ions and this voltage controls the ion acceleration and the depth of penetration of these ions into the amorphous silicon carbide and/or cap layer. The dose concentration is directly correlated to the sample concentration (e.g., the concentration of ions in the amorphous silicon carbide). To obtain lower concentrations, a cap layer comprising gold was deposited over the amorphous silicon carbide and ions were implanted into both the amorphous layer and the additional "cap" layer thereon. Higher voltage, e.g., 175 keV, may be used to accelerate the ions for implantation into the a-SiC having the cap layer thereon. Gold films having thicknesses of 180 nm and 190 nm were employed as the cap layer for different samples. Vanadium doses of $1\times10^{12}$ ions/$cm^2$ and $1\times10^{13}$ ions/$cm^2$ were used and produced vanadium dose concentrations of $1\times10^{7}$ ions/$cm^2$ and $1\times10^{8}$ ions/$cm^2$ concentrations, respectively as a result of the cap layer. The gold cap layer was removed after ion implantation. Accordingly, by using the cap layer, e.g., comprising a gold film, the amount of vanadium ions implanted within the amorphous silicon carbide is reduced. Thicker layers (e.g., of gold) may further reduce the ion concentration. In various implementations, after ion implantation, the samples were annealed (e.g., using a rapid thermal anneal (RTA)) at 1200 C.

Doped amorphous silicon carbide potentially offers one or more of the following advantages. Doped amorphous silicon carbide may be scalable, compatible with CMOS processing and possibly silicon photonics, can take advantage of existing silicon carbide processes, and offers compatibility with wafers such as silicon wafers and silicon on insulator wafers due to its amorphous nature. Wide band gap semiconductors also offer the potential for elevated temperature operation as a result of the relationship between bandgap energy, bond strength and thermal conductivity and electric field breakdown. Use of vanadium as a dopant also offers an emission wavelength near the 1300 nm telecom wavelength.

A wide variety of variations in the design, configuration, operation, and methods of fabrication are possible. For example, in some implementations, for implanting the ions (e.g., vanadium ions) 12 in the a-SiC host 10, the dose concentration may be $1\times10^{16}$ ions/cm$^2$, $1\times10^{15}$ ions/cm$^2$, $1\times10^{14}$ ions/cm$^2$, $1\times10^{13}$ ions/cm$^2$, $1\times10^{12}$ ions/cm$^2$, $1\times10^{11}$ ions/cm$^2$, $1\times10^{10}$ ions/cm$^2$, $1\times10^{9}$ ions/cm$^2$, $1\times10^{8}$ ions/cm$^2$, $1\times10^{7}$ ions/cm$^2$, $1\times10^{6}$ ions/cm$^2$, $5\times10^{5}$ ions/cm$^2$, $1\times10^{5}$ ions/cm$^2$ or any range formed by any of these values, although values outside these ranges are possible. Similarly, in some implementations, the ion concentration in the a-SiC may be $1\times10^{21}$ ions/cm$^3$, $1\times10^{20}$ ions/cm$^3$, $1\times10^{19}$ ions/cm$^3$, $1\times10^{18}$ ions/cm$^3$, $1\times10^{17}$ ions/cm$^3$, $1\times10^{16}$ ions/cm$^3$, $1\times10^{15}$ ions/cm$^3$, $1\times10^{14}$ ions/cm$^3$, $1\times10^{13}$ ions/cm$^3$, $1\times10^{12}$ ions/cm$^3$, $1\times10^{11}$ ions/cm$^3$, $5\times10^{10}$ ions/cm$^3$, $1\times10^{10}$ ions/cm$^3$ or any range formed by any of these values, although values outside these ranges are possible. These values may correspond to at least the concentrations associated with a portion of the amorphous silicon carbide host, for example, the portion that receives the pump energy (e.g., the portion on which the pump light or pump beam is incident) and/or from which light is collected.

In some implementations, the density of ions (e.g., vanadium ions) 12 in the a-SiC host 10 is 200 vanadium ions per 10 μm by 10 μm square area, 20 vanadium ions per 10 μm by 10 μm square area, 2 vanadium ions per 10 μm by 10 μm square area, 1 vanadium ion per 10 μm by 10 μm square area, 0.2 vanadium ion per 10 μm by 10 μm square area, or 0.1 vanadium ion per 10 μm by 10 μm square area, possibly on average, or any range formed by any of these values, although values outside these ranges are possible. In some implementations, the density of ions (e.g., vanadium ions) 12 in the a-SiC host 10 is 200 vanadium ions per 1 μm by 1 μm square area, 20 vanadium ions per 1 μm by 1 μm square area, 2 vanadium ions per 1 μm by 1 μm square area, or 1 vanadium ion per 1 μm by 1 μm square area, possibly on average, or any range formed by any of these values, although values outside these ranges are possible. These values may correspond to at least the concentrations associated with a portion of the amorphous silicon carbide host, for example, the portion that receives the pump energy (e.g., the portion on which the pump light or pump beam is incident) and/or from which light is collected.

In some implementations, the density of ions (e.g., vanadium ions) 12 in the a-SiC host 10 is 0.1 ion per 1 μm$^2$, 0.5 ion per 1 μm$^2$, 1 ion per 1 μm$^2$, 1 ion per 5 μm$^2$, 1 ion per 10 μm$^2$, 1 ion per 20 μm$^2$, 1 ion per 30 μm$^2$, 1 ion per 40 μm$^2$, 1 ion per 50 μm$^2$, 1 ion per 60 μm$^2$, 1 ion per 75 μm$^2$, 1 ion per 80 μm$^2$, 1 ion per 90 μm$^2$, 1 ion per 100 μm$^2$, 1 ion per 110 μm$^2$, 1 ion per 120 μm$^2$, 1 ion per 130 μm$^2$, 1 ion per 140 μm$^2$, 1 ion per 150 μm$^2$, 1 ion per 175 μm$^2$, 1 ion per 200 μm$^2$, 1 ion per 250 μm$^2$, 1 ion per 300 μm$^2$, 1 ion per 350 μm$^2$, 1 ion per 400 μm$^2$, 1 ion per 500 μm$^2$, possibly on average, or any range formed by any of these values, although values outside these ranges are possible. These values may correspond to at least the concentrations associated with a portion of the amorphous silicon carbide host, for example, the portion that receives the pump energy (e.g., the portion on which the pump light or pump beam is incident) and/or from which light is collected.

EXAMPLES

This disclosure provides various examples of devices, systems, and methods comprising amorphous silicon carbide doped with ions such as vanadium ions. This doped amorphous silicon carbide may be pumped, e.g., optically or electrically pumped, to excite one or more ions and cause the one or more ions to emit light. This emitted light may be collected from the one or more ions. Some such examples include but are not limited to the following examples.

1. A light source comprising:
   a light emitter comprising amorphous silicon carbide having an ion therein; and
   a pump configured to direct energy to said amorphous silicon carbide to excite said ion into a higher energy state such that said ion emits light.
2. The light source of Example 1, wherein said light source comprises a single photon light source, said light emitter configured to emit an optical pulse comprising a single photon.
3. The light source of Example 1 or 2, wherein said ion comprise a vanadium ion.
4. The light source of any of the examples above, wherein said pump comprises an optical pump configured to output light that is directed to said amorphous silicon carbide to excite said ion therein.
5. The light source of any of the examples above, wherein said pump comprises an optical pump configured to output light that is directed as a beam of light to said amorphous silicon carbide to excite said ion therein, said beam of light incident on an area of said amorphous silicon carbide, said ion comprising the only ion within said area configured to emit said light.
6. The light source of Example 4 or 5, wherein said optical pump comprises a laser.
7. The light source of any of Examples 1 to 3, wherein said pump comprises an electrical contact configured to deliver electrical power to said ion to excite said ion into a higher energy state such that said ion emits light.
8. The light source of any of the examples above, wherein said amorphous silicon carbide comprises a layer of amorphous silicon carbide on a silicon substrate.
9. The light source of any of the examples above, wherein said amorphous silicon carbide is included in a microstructure or a nanostructure.
10. The light source of any of the examples above, wherein said amorphous silicon carbide is included in a pillar.
11. The light source of any of the examples above, wherein said amorphous silicon carbide is integrated in a photonic integrated circuit.
12. The light source of any of the examples above, wherein said amorphous silicon carbide is included in an optical resonator.

13. The light source of any of the examples above, wherein said amorphous silicon carbide is included in a ring resonator.
14. The light source of any of Examples 1-12, wherein said amorphous silicon carbide is included in a microdisc.
15. The light source of any of the examples above, wherein said light source comprises a single photon emitter included in a quantum computing device.
16. The light source of any of the examples above, further comprising a stop, an aperture, or a pin hole to collect light from a single ion.
17. The light source of any of the examples above, wherein said ion is the only ion within an area in the range of from 75 to 400 μm² of said amorphous silicon carbide.
18. The light source of any of the examples above, wherein said ion is the only ion within an area in the range of from 50 to 200 μm² of said amorphous silicon carbide.
19. The light source of any of the examples above, wherein said amorphous silicon carbide is doped with less than that $1\times10^{15}$ ions/cm³ in at least a portion thereof.
20. The light source of any of the examples above, wherein said amorphous silicon carbide is doped with from $1\times10^{15}$ ions/cm³ to $1\times10^{11}$ ions/cm³ in at least a portion thereof.
21. The light source of any of the examples above, wherein said light source comprises a single photon emitter.
22. The light source of any of the examples above, wherein said amorphous silicon carbide is doped with a plurality of ions.
23. The light source of any of the examples above, wherein said amorphous silicon carbide is doped with a plurality of ions and said pump energy is incident on only one of said ions.
24. The light source of any of the examples above, wherein amorphous silicon carbide is doped with a plurality of ions, said pump energy is incident on a plurality of said ions, and said light is collected from only one of said ions.
25. A device comprising:
    a host comprising amorphous silicon carbide; and
    a vanadium ion in said host of amorphous silicon carbide.
26. The device of Example 25, wherein said ion comprises a vanadium ion.
27. The device of any of Examples 25 or 26, wherein said amorphous silicon carbide comprises a layer of amorphous silicon carbide on a silicon substrate.
28. The device of any of Examples 25 to 27, wherein said amorphous silicon carbide is included in a microstructure or nanostructure.
29. The device of any of Examples 25 to 28, wherein said amorphous silicon carbide is included in a pillar.
30. The device of any of Examples 25 to 29, wherein said amorphous silicon carbide is integrated in a photonic integrated circuit.
31. The device of any of Examples 25 to 30, wherein said amorphous silicon carbide is included in an optical resonator.
32. The device of any of Examples 25 to 31, wherein said amorphous silicon carbide is included in a ring resonator.
33. The device of any of Examples 25 to 31, wherein said amorphous silicon carbide is included in a microdisc.
34. The device of any of Examples 25 to 33, further comprising a stop, an aperture, or pin hole to collect light from a single ion.
35. The device of any of Examples 25 to 34, wherein said amorphous silicon carbide is doped with less than that $1\times10^{15}$ ions/cm³ in at least a portion thereof.
36. The device of any of Examples 25 to 34, wherein said amorphous silicon carbide is doped with from $1\times10^{15}$ ions/cm³ to $1\times10^{11}$ ions/cm³ in at least a portion thereof.
37. The device of any of Examples 25 to 36, wherein said vanadium ion is the only vanadium ion within an area in the range of from 80 to 300 μm² of said amorphous silicon carbide.
38. The device of any of Examples 25 to 36, wherein said vanadium ion is the only vanadium ion within an area in the range of from 90 to 200 μm² of said amorphous silicon carbide.
39. The device of any of Examples 25 to 38, further comprising an optical pump configured to output light that is directed to said amorphous silicon carbide to excite said vanadium ion therein, said light incident on an area of said amorphous silicon carbide, said vanadium ion comprising the only vanadium ion within said area.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A light source comprising:
   a light emitter comprising amorphous silicon carbide having an ion therein; and
   a pump configured to direct energy to said amorphous silicon carbide to excite said ion into a higher energy state such that said ion emits light,
   wherein said ion comprises a vanadium ion.

2. The light source of claim 1, wherein said light source comprises a single photon emitter.

3. The light source of claim 1, wherein said pump comprises an optical pump configured to output light that is directed to said amorphous silicon carbide to excite said ion therein.

4. The light source of claim 1, wherein said pump comprises an optical pump configured to output light that is directed as a beam of light to said amorphous silicon carbide to excite said ion therein, said beam of light incident on an area of said amorphous silicon carbide, said ion comprising the only ion within said area.

5. The light source of claim 3, wherein said optical pump comprises a laser.

6. The light source of claim 1, wherein said pump comprises an electrical contact configured to deliver electrical power to said ion to excite said ion into a higher energy state such that said ion emits light.

7. The light source of claim 1, wherein said amorphous silicon carbide comprises a layer of amorphous silicon carbide on a silicon substrate.

8. The light source of claim 1, wherein said amorphous silicon carbide is included in a nanostructure or microstructure.

9. The light source of claim 1, wherein said amorphous silicon carbide is integrated in a photonic integrated circuit.

10. The light source of claim 1, wherein said amorphous silicon carbide is included in an optical resonator.

11. The light source of claim 1, wherein said amorphous silicon carbide is included in a ring resonator or a microdisc.

12. The light source of claim 1, further comprising a stop, aperture, or pin hole to collect light from a single ion.

13. A light source comprising:
    a host comprising amorphous silicon carbide;
    a vanadium ion in said host of amorphous silicon carbide; and
    an optical pump configured to output light that is directed to said amorphous silicon carbide to excite said vanadium ion therein, said light incident on an area of said amorphous silicon carbide, said vanadium ion comprising the only vanadium ion within said area.

14. The light source of claim 13, wherein said amorphous silicon carbide comprises a layer of amorphous silicon carbide on a silicon substrate.

15. The light source of claim 13, wherein said amorphous silicon carbide is included in a nanostructure or microstructure.

16. The light source of claim 13, wherein said amorphous silicon carbide is integrated in a photonic integrated circuit.

17. The light source of claim 13, wherein said amorphous silicon carbide is included in an optical resonator.

18. The light source of claim 13, wherein said amorphous silicon carbide is included in a ring resonator or a microdisc.

* * * * *